(12) United States Patent
Chuang-Pan et al.

(10) Patent No.: US 7,751,167 B2
(45) Date of Patent: Jul. 6, 2010

(54) PROTECTIVE CIRCUIT FOR A SUPERSONIC HUMIDIFIER

(76) Inventors: Huang Chuang-Pan, No. 52, Alley 41, Lane 496, An-Ho Rd., Sec. 1, Tainan City (TW); Huang Chen-Lung, No. 17, Hsin-Jen Rd., Tainan City (TW)

( * ) Notice: Subject to any disclaimer, the term of this patent is extended or adjusted under 35 U.S.C. 154(b) by 2630 days.

(21) Appl. No.: 09/771,516

(22) Filed: Jan. 17, 2001

(65) Prior Publication Data

US 2002/0093776 A1 Jul. 18, 2002

(51) Int. Cl.
*H02H 3/00* (2006.01)
*B01D 47/00* (2006.01)
*B05B 17/06* (2006.01)

(52) U.S. Cl. .................. 361/86; 261/26; 128/200.16

(58) Field of Classification Search ............... 361/18, 361/78, 86; 236/44 R; 72/23.2, 29.01; 261/26; 128/200.16

See application file for complete search history.

(56) References Cited

U.S. PATENT DOCUMENTS

| | | | | |
|---|---|---|---|---|
| 3,989,042 A | * | 11/1976 | Mitsui et al. | 128/200.16 |
| 4,146,775 A | * | 3/1979 | Kirchner et al. | 392/327 |
| 4,449,188 A | * | 5/1984 | Unoguchi et al. | 700/276 |
| 4,820,453 A | * | 4/1989 | Huang | 261/26 |
| 5,014,908 A | * | 5/1991 | Cox | 236/44 E |
| 6,135,427 A | * | 10/2000 | Tsai | 261/26 |
| 6,462,314 B1 | * | 10/2002 | Huang et al. | 219/501 |

* cited by examiner

*Primary Examiner*—Stephen W Jackson
*Assistant Examiner*—Scott Bauer
(74) *Attorney, Agent, or Firm*—J.C. Patents

(57) ABSTRACT

A protective circuit for a supersonic humidifier includes a compare circuit to obtain working voltage at two terminals of an ultrasonic vibrating member to decide whether the humidifier is to be continued to operate or stopped so as to protect it from burning up. The protective circuit does not utilize a vibration needle, a float, a magnetic switch and a HALL IC used in conventional humidifiers.

3 Claims, 1 Drawing Sheet

PROTECTIVE CIRCUIT FOR A SUPERSONIC HUMIDIFIER

BACKGROUND OF THE INVENTION

Figure 1:
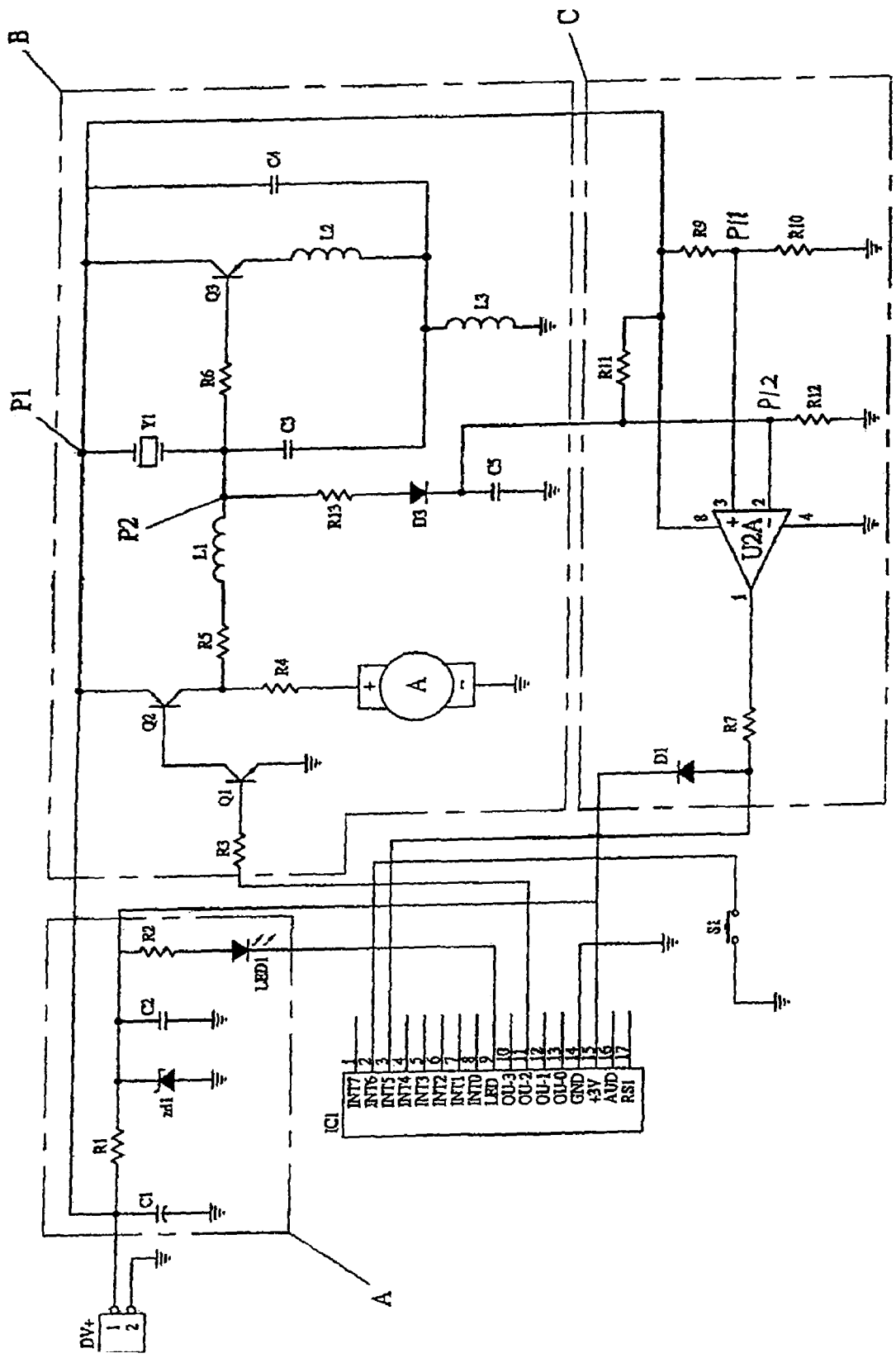

This invention relates to a protective circuit for a supersonic humidifier, particularly to one utilizing a compare circuit to obtain working voltage at two terminals of an ultrasonic vibrating member for deciding to turn off or continue to let a switch on so that the humidifier may be timely stopped in case of no water left in a water tank, without possibility of burning up.

Nowadays, conventional supersonic humidifiers all use a detective element in a water tank to detect if there is water in the water tank or not so that an ultrasonic vibrating member should continue to operate or not with the power switch being on. In this way the humidifier may operate normally, protected from burning up in case of no water in the water tank.

However, the detective element such as a vibrating needle, a magnetic switch, a HALL IC in cooperation of a float occupies large dimensions, hardly applicable to a comparatively small humidifier. Besides, in case that water in the water tank is used up, or the float is placed upside down, the detecting element may detect erroneously to let the humidifier continue to operate, resulting in burning up.

SUMMARY OF THE INVENTION

This invention has been devised to offer a protective circuit for a supersonic humidifier, which can produce compared signals for deciding whether the humidifier should continue to operate or to stop.

The feature of the invention is a drive circuit containing a compare circuit to obtain working current, working voltage at two terminals of an ultrasonic vibrating member to decide to continue or stop operation of the humidifier so as to protect it from burning up.

BRIEF DESCRIPTION OF A DRAWING

This invention will be better understood by referring to the accompanying drawing, wherein:

FIG. 1 is a diagram of a protective circuit for a supersonic humidifier in the present invention.

DETAILED DESCRIPTION OF THE PREFERRED EMBODIMENT

A preferred embodiment of a protective circuit for a supersonic humidifier in the present invention, as shown in FIG. 1, includes an input terminal of DCV power source, a voltage stabilizing circuit A connected to the input terminal, a drive circuit B having a terminal P2 of an inductance L1, an ultrasonic vibrating member Y1, a capacitor C3 and a resistor R6, and continually connected to the voltage stabilizing circuit A, an indicator L1, an ultrasonic vibrating member Y1, a capacitor C3, and a resistor R6. Then input signal is fed at the terminal P2 to a voltage dividing circuit composed of a resistor 13, a diode D3 and a capacitor C5, and then to a compare circuit C composed of resistor R12, and a minus input terminal or a second pin of an OP amplifier U2A, functioning as a signal input. Another terminal P1 of the ultrasonic vibrating member Y1 is connected to one terminal of a resistor R9, supplying a signal input (or input voltage), which is divided by the resister R9 and the R10, and the terminal P11 may produce a divided voltage to be sent as an input to the third pin of the OP amplifier U2A, that is, the signal input coming from P2 is sent to the second pin 2 of the OP amplifier U2A, and the signal input coming from the terminal P1 is sent to a third pin 3 of the OP amplifier U2A. As the input at the P1 is sent to the compare circuit, the voltage sent from the P1 to the P11 of the compare circuit (C) is stable and constant because the voltage at the P1 is equal to that at the input terminal of the DCV source. For example, if the voltage at the input terminal of the DCV source is 24 v, that at the P1 is also 24 v. If the value of the resistor R9 and R10 of the compare circuit C are the same, the voltage at the P11 is 11 v, after divided. So the input voltage at the third pin of the OP amplifier U2A is also 11 v. Nevertheless, P2 is affected by the signal alteration by the water level in the water tank of the humidifier by detection of the ultrasonic vibrating member Y1, the voltage (signal) at the P2 sent to the P12 may alter depending on the water quantity in the store tank of the ultrasonic vibrating member Y1.

In operation of the protective circuits, the ultrasonic vibrating member Y1 operates normally in case the water level in the water tank of the humidifier is normal, so the working current, the working voltage received by the terminal P2 is normal. In other words, the two values of the signal sources at the terminals p1 and P2 transmitted to the second and the third pin of the OP amplifier U2A are substantially stable, so the signal sent from the first pin 1 of the OP amplifier U2A to an integrated circuit IC1 is relatively stable. Then input voltage sent to the third pin 3 of the U2A, is larger than that sent to the second pin 2, keeping the U2A ON. Then output voltage from the output pin 1 of the U2A is equal to that at the P11 to let the ICI operate normal. Therefore, transistors Q1 and Q2 in the driving circuit B of the ultrasonic vibrating member Y1 is normally ON, with the ultrasonic vibrating member Y1 kept stable under operation. But provided that the water in the water tank is used up and dry, the working current, the working voltage of the ultrasonic vibrating member Y1 may change (given each value changing larger or smaller than the normal value, resting on the material and manufacturing methods of makers of ultrasonic vibrating members.) In this invention, the working current, the working voltage and the supersonic frequency are enhanced, as the ultrasonic vibrating member produces high temperature, the working current is also upgraded, with the working voltage elevated at the same time and with the voltage at the P2 increased accordingly. P11, so the input voltage of at the second pin 2 of the OP amplifier U2A is higher than that at the third pin 3, forcing the first pin 1 of the OP amplifier U2A not to transmit a signal output to the IC1, turning the OP amplifier U2A OFF, and subsequently the transistors Q1 and Q2 also turned Off, stopping the ultrasonic vibrating member Y1 so as to protect the humidifier.

While the preferred embodiment of the protective circuit for a supersonic humidifier has been described above, it will be recognized and understood that various modifications may be made therein and the appended claims are intended to cover all such modifications that may fall within the spirit and scope of the invention.

What is claimed is:

1. A protective circuit for a supersonic humidifier comprising:
   an input terminal of a DC source;
   a voltage stabilizing circuit connected to said input terminal of the DC source;
   a drive circuit for driving an ultrasonic vibrating member, the drive circuit having a voltage dividing circuit and being electrically connected to said voltage stabilizing circuit;

a compare circuit electronically connected to the drive circuit, the compare circuit having an OP amplifier with a first pin, a second pin, and a third pin;

wherein the ultrasonic vibrating member has a first terminal and a second terminal, the first terminal is connected to a first node of the drive circuit, the first node is electrically connected to the voltage stabilizing circuit, the first node is also electrically connected to first and second resistors which are serially connected resistors of the compare circuit, the first and second resistors divide voltage from the voltage stabilizing circuit, a second node between the first and second serially connected resistors is electrically connected to the third pin of said OP amplifier; and the second terminal is connected to the voltage dividing circuit, the voltage dividing circuit is connected to a third resistor of the compare circuit, a third node between the voltage dividing circuit and the third resistor is connected to the second pin of the OP amplifier;

wherein working current and working voltage of the ultrasonic vibrating member changes when water in a water tank of the supersonic humidifier is used up so that voltage at the second terminal increases, resulting in a voltage increase at the second pin of the OP amplifier; and when voltage at the second pin becomes higher than that at the third pin, the OP amplifier turns off, which in turn turns off transistors of the drive circuit so as to stop the operation of the ultrasonic vibrating member for protecting the supersonic humidifier.

2. The protective circuit for a supersonic humidifier in claim 1, wherein the voltage driving circuit comprises a third resistor and a diode in serial connection with the diode being connected to the third resistor of the compare circuit, and a capacitor with one end connected to a point between the diode and the third resistor and the other end connected to ground.

3. The protective circuit for a supersonic humidifier in claim 1, wherein the first pin of the OP amplifier is connected to an integrated circuit.

\* \* \* \* \*